Patented June 1, 1954

2,680,102

UNITED STATES PATENT OFFICE 2,680,102

FIRE-RESISTANT PRODUCT FROM COM-MINUTED WOODY MATERIAL, UREA, OR MELAMINE - FORMALDEHYDE, CHLORIN-ATED HYDROCARBON RESIN, AND HY-DRATED ALUMINA

Hubert Leopold Becher, Trenton, N. J., assignor to Homasote Company, Fernwood, Ewing Township, Mercer County, N. J., a corporation of New Jersey No Drawing. Application July 3, 1952,
Serial No. 297,173

7 Claims. (Cl. 260—17.3)

This invention relates to improved products such as boards, sheets, and molded articles formed of comminuted wood and binding material. The invention is particularly directed to products which are characterized by their fire-resistant properties.

Several processes have been developed for making boards, sheets and molded articles wherein sawdust, ground wood or wood chips are combined with thermosetting binders and subjected to heat and pressure for producing a molded product. The binders used most frequently are phenolic-type resins or amine resins. However, products in which such binders are used are relatively inflammable and burn readily or smolder for prolonged periods of time when subjected to the "Crib Test" described in the Proceedings of the American Society for Testing Materials, vol. 41, page 238 (1941). According to this test, pieces of the material to be tested are arranged in spaced relation and in successive tiers to form a crib or chimney-like arrangement and a Mekker burner is placed beneath the assembly for a period of three minutes. On removal of the burner the material should cease to burn or glow within a prescribed time, generally one minute or less.

In accordance with the present invention, products formed of sawdust, ground wood or wood chips and a binder are produced which show remarkable fire resistance when subjected to the "Crib Test." This result is attained by employing a novel type of binder containing amine resin, chlorinated resin and hydrated alumina in definitely related proportions.

As pointed out in applicant's issued Patent No. 2,611,694 dated September 23, 1952, it has been found that a combination of amine resin, chlorinated resin and hydrated alumina when used as a binder for felted fibrous material will render the resulting product fire-resistant when subjected to the "Crib Test." However, it is found that binders useful for this purpose in felted fibrous materials are wholly inadequate and quite useless as fire retardants when employed as a binder for sawdust, ground wood or wood chips. This may be due to differences in size or surface area of the organic material or to differences in porosity or density or to other causes. In any event, it is found that the amount of amine resin and chlorinated resin must be reduced and the amount of hydrated alumina must be increased over those used in felted fibrous products and must be controlled within definite limits if fire-resistant properties are to be imparted to products containing substantial amounts of sawdust, ground wood or wood chips.

One of the objects of the present invention is to provide a new type of fire-resistant product formed of comminuted wood and a binder.

Another object of the invention is to provide a compressed composition containing comminuted wood and a binder with the constituents of the binder chosen and proportioned within definite limits to impart fire-resistant properties to the product.

A further object of the invention is to provide composition sheet material containing comminuted wood and a binder comprising an amine resin, chlorinated resin and hydrated alumina in such proportions that the product will possess fire-resistant properties while retaining desirable mechanical strength.

These and other objects and features of the present invention will appear from the following description thereof in which reference is made to preferred compositions and procedure for the purpose of indicating the nature of the invention, but without intending to limit the scope of the invention thereto.

In producing products in accordance with the present invention, the woody substance employed may be sawdust, wood flour, ground or comminuted wood or wood chips. These woody substances may be used by themselves or in various combinations and proportions. For most purposes, it is preferred to employ a sufficient amount of the woody substance to constitute from 50% to 65% by weight of the finished product. The wood employed may be any of the usual hard or soft woods in comminuted form but should be controlled with respect to its moisture content so that the composition being molded will contain no more than about 20% of moisture.

The binder employed preferably constitutes about 35% to 50% of the finished product and contains amine resin, chlorinated resin and hydrated alumina. The proportions of the constituents which are employed in combination with each other determine the fire-resistant properties of the finished product. For most purposes, the amount of amine resin used should constitute from about 20% to 30% by weight of the binder. The chlorinated resin should be about 10% to 20% by weight of the binder and the hydrated alumina should amount to from 40% to 60% of the binder. Based on the weight of the finished product, the best results are attained when the amine resin equals about 10% to 15% of the product, the chlorinated resin is about 5% to 10% by weight of the finished product and the hydrated alumina constitutes about 20% to 30% of the product.

Fire-resistant properties are imparted to the product when the amine resin is as low as 5% but if it is less than about 10% the mechanical strength of the product is reduced and is generally too low for use in most types of wall board or similar products. On the other hand, the use of more than 15% of the amine resin does not appear to increase the mechanical strength of the product appreciably and the expense of the product is increased unnecessarily. Furthermore, the fire-resistant properties of the product are decreased if much more than 15% of the amine resin is used in the product.

When less than about 2% or more than 10% of chlorinated resin is employed, the fire-resistant properties of the product are impaired. Moreover, if more than 10% of chlorinated resin is used, the composition tends to stick in the mold during the pressing operation and may stain or darken the finished product.

If less than 20% of the hydrated alumina is used, the fire-resistant properties of the resulting product will be poor, whereas the use of more than 30% by weight of the hydrated alumina reduces the mechanical strength of the finished product.

The type of amine resin selected may vary and in general may be any thermosetting condensation product of urea, melamine or their formaldehyde combinations. Such resins may be employed in either a liquid or dry form. When using a relatively dry sawdust, a solution or dispersion of the resin or of the urea and formaldehyde, for example, may conveniently be added to the woody constituents and mixed therewith by tumbling, stirring or otherwise. At other times, the dry finely ground resin may be added to the remaining ingredients during mixing.

The chlorinated resins which may be used may be any of the chlorinated paraffins of varying chlorine content. Chlorinated diphenyl, polyvinyl chloride, chlorinated rubber, and the like also may be used and these compounds together with the chlorinated paraffins are herein referred to as a class by the term "chlorinated resin." Although the chlorinated paraffins may not technically be true resins, they are, nevertheless, recognized and known to the trade as "chlorinated resins." It is preferable to employ chlorinated paraffins having a relatively high chlorine content, say 70% chlorine.

For most pressing or molding operations the moisture contained in the mixure to be molded, whether present as moisture in the woody material itself or as moisture or water added with the resins or other constituents, should be within the limits of about 8% to 20% of the total weight of the mixture. While the moisture content of the mix does not materially affect the fire-resistant properties of the finished product, it is found that when the moisture content of the molding mixture is less than about 8%, the bonding or molding properties of the mixture are relatively poor. On the other hand, if the molding composition contains more than about 20% of moisture, the material tends to blister during the operations of heating and pressing or upon release of pressure from the material while it is in a heated condition. It is generally preferable for the composition being molded to contain from about 12% to 15% of moisture and in order to obtain this condition it is often necessary to heat or dry the sawdust or woody material, especially if the sawdust is produced from green lumber or has been allowed to stand out in the weather. Weathered sawdust usually contains more than 20% of moisture and when used the pre-treatment of heating or drying the sawdust or woody material can be effected in any suitable or conventional manner. When the sawdust is derived from kiln dried lumber, no such heating or drying is ordinarily necessary since the moisture content of such sawdust is relatively low and may not exceed 3% or 4% by weight.

Typical products embodying the present invention may have the following composition in parts by weight:

|  | Example I | Example II | Example III |
| --- | --- | --- | --- |
| Sawdust | 100 | 100 | 100 |
| Hydrated alumina | 31 | 41 | 60 |
| Chlorinated paraffin | 8 | 8 | 10 |
| Amine resin | 16 | 17 | 30 |

In producing sheets having compositions such as those indicated above the following procedure may be followed—the composition of Example II being chosen for illustration.

100 lbs. of kiln dried white pine sawdust, varying in size from 10 to 60 mesh with less than 40% passing a 30 mesh screen, and containing approximately 4% of moisture, are placed in mixing or blending equipment with 41 pounds of hydrated alumina in the form of an amorphous powder. The two are thoroughly mixed and thereafter 8 pounds of finely powdered chlorinated paraffin (70% chlorine) and 17 pounds of dry powdered urea-formaldehyde resin are added to the mixture together with sufficient water to insure a total of about 15% moisture in the mixture. The composition then is sheeted and subjected to a pressure of about 250 to 300 lbs. per square inch at a temperature of 280° F. to 320° F. for a period sufficient to insure complete reaction and bonding of the resin within the sheet. The duration of such pressing will vary with the thickness of the sheet but will generally be from about 1 to 20 minutes for sheets which are from 1/8 to 1 inch in thickness.

The resulting sheet when cooled has a tensile strength of about 1300 pounds per square inch and a transverse strength of about 2500 pounds per square inch.

In order to illustrate the significance of the limitations in composition of the binder Table I is cited below wherein the percentage of the ingredients in the composition were varied and the resulting samples were subjected to the Crib Test to determine their fire-resisting properties.

When the loss in weight of the sample after being subjected to the Crib Test exceeds 30%, the composition is considered to be insufficiently fire-resistant to be a satisfactory product.

Table I

| Sample No. | A | B | C | D | E | F | G | H | I |
|---|---|---|---|---|---|---|---|---|---|
| Sawdust | 60 | 60 | 60 | 65 | 60 | 60 | 60 | 65 | 55 |
| Hydrated alumina | 25 | 25 | 25 | 20 | 25 | 30 | 25 | 25 | 25 |
| Chlorinated paraffin | 10 | 3 | 5 | 5 | | | 5 | | |
| Amine resin | 5 | 12 | 10 | 10 | 15 | 10 | | 10 | 20 |
| Phenolic resin | | | | | | | 10 | | |
| Percent loss Crib Test | 18.6 | 19.9 | 21.3 | 28.8 | 72.4 | 62.6 | 51.3 | 74.5 | 38.3 |

It will be noted from Table I that Samples A, B, C and D represent rather wide variations in the proportions of the chlorinated paraffin and amine resin but that such changes have little effect on the fire-resistance so long as the total resin content is properly balanced with respect to the hydrated alumina. Although Sample A was satisfactory in its fire-resistant property, the product has limited mechanical strength. While a reduction in the hydrated alumina content to 20% (Sample D) results in a permissable increase in loss under the Crib Test, the omission of the chlorinated paraffin (Samples E, F, H and I) or the substitution of phenolic resin for the amine resin (Sample G) gives rise to such marked increases in loss under the Crib Test as to render the products unsatisfactory.

Products embodying the present invention and produced as described above are adapted for a great variety of uses as, for example, wall board, panels, table tops, and in the manufacture of cupboards, partitions or as a substitute for wood for substantially any purpose. Molded products such as ash trays, lamp bases and book ends may also be made from the composition. It is capable of taking an excellent polish and may of course be colored by the addition of dyes, pigments or stains. Moreover, the resin used may be colored while the wood retains its natural appearance so as to give the product an interesting mottled appearance.

At least part of the woody material can, of course, be replaced by asbestos, mineral wool or fibrous materials although for most purposes the use of woody material such as sawdust or comminuted wood is preferred and should constitute the major portion of the composition with which the binder is used.

While the invention has been described with particular reference to specific compositions, the proportions of the ingredients may be varied widely within the limits indicated. It is also possible to produce products having the composition indicated by various methods. In view thereof, it should be understood that the particular examples cited have been chosen for the purposes of illustration only and are not intended to limit the scope of the invention.

I claim:

1. A fire-resistant product comprising from about 50 to 65% by weight of comminuted woody material and from 35 to 50% by weight of a binder containing from about 5 to 15% of thermosetting amine resin selected from the group consisting of urea-formaldehyde and melamine formaldehyde resins, from about 2 to 10% of chlorinated hydrocarbon resin and from about 20 to 30% of hydrated alumina based on the weight of the product.

2. A fire-resistant product comprising from about 50 to 65% by weight of comminuted woody material and from 35 to 50% by weight of a binder consisting of from about 10 to 15% of thermosetting amine resin selected from the group consisting of urea-formaldehyde and melamine formaldehyde resins, 5 to 10% of chlorinated hydrocarbon resin and 20 to 30% of hydrated alumina based on the weight of the product.

3. A molded product consisting of comminuted wood and a binder wherein the binder constitutes from 35 to 50% by weight of the product and from about 20 to 30% of the binder is thermosetting amine resin selected from the group consisting of urea-formaldehyde and melamine formaldehyde resins, 10 to 20% of the binder is chlorinated hydrocarbon resin and 40 to 60% of the binder is hydrated alumina.

4. A fire-resistant product comprising a molded and compressed sheet consisting of comminuted wood and a binder wherein the binder constitutes from 35 to 50% by weight of the product and from about 20 to 30% of the binder is thermosetting amine resin selected from the group consisting of urea-formaldehyde and melamine formaldehyde resins, 10 to 20% of the binder is chlorinated hydrocarbon resin and 40 to 60% of the binder is hydrated alumina.

5. A fire-resistant product comprising an integral sheet consisting of sawdust and a binder, wherein the binder constitutes from 35 to 50% by weight of the product and is composed of approximately 41 parts by weight of hydrated alumina, 8 parts by weight of chlorinated paraffin containing 70% of chlorine, and 17 parts by weight of urea-formaldehyde resin.

6. A mixture for use in producing fire-resistant products comprising from about 50 to 65 parts by weight of comminuted woody material and from about 35 to 50 parts by weight of a binder containing from about 5 to 15 parts by weight of a thermosetting amine resin selected from the group consisting of urea-formaldehyde and melamine formaldehyde resins, from about 2 to 10 parts by weight of chlorinated hydrocarbon resin, from about 20 to 30 parts by weight of hydrated alumina and from about 8 to 20 parts by weight of moisture.

7. The method of producing a fire-resistant product which comprises the steps of mixing together from about 50 to 65 parts by weight of comminuted woody material and from about 35 to 50 parts by weight of a binder containing from about 5 to 15 parts by weight of a thermosetting amine resin selected from the group consisting of urea-formaldehyde and melamine formaldehyde resins, from about 2 to 10 parts by weight of chlorinated hydrocarbon resin, from about 20 to 30 parts by weight of hydrated alumina and from about 8 to 20 parts by weight of moisture, sheeting the resulting mixture and subjecting the sheeting to a pressure of from about 250 to 350 pounds per square inch at a temperature of about 280° F. to 320° F.

References Cited in the file of this patent

UNITED STATES PATENTS

| Number | Name | Date |
|---|---|---|
| 2,611,694 | Becher | Sept. 23, 1952 |